United States Patent
Chae et al.

(10) Patent No.: US 11,435,611 B2
(45) Date of Patent: Sep. 6, 2022

(54) DISPLAY APPARATUS COMPRISING A MIDDLE MOLD FRAME HAVING A REFLECTOR PROVIDED WITH A CURVED REFLECTIVE SURFACE

(71) Applicant: SAMSUNG ELECTRONICS CO., LTD., Suwon-si (KR)

(72) Inventors: Hyun Joong Chae, Suwon-si (KR); Dae Jin Kim, Suwon-si (KR); Yeon Ho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 16/729,621

(22) Filed: Dec. 30, 2019

(65) Prior Publication Data

US 2020/0218112 A1 Jul. 9, 2020

(30) Foreign Application Priority Data

Jan. 3, 2019 (KR) .................. 10-2019-0000944

(51) Int. Cl.
*G02F 1/1333* (2006.01)
*F21V 8/00* (2006.01)

(52) U.S. Cl.
CPC ..... *G02F 1/133308* (2013.01); *G02B 6/0051* (2013.01); *G02B 6/0055* (2013.01); *G02B 6/0088* (2013.01); *G02F 1/13332* (2021.01); *G02F 1/133314* (2021.01); *G02F 1/133317* (2021.01)

(58) Field of Classification Search
None
See application file for complete search history.

(56) References Cited

U.S. PATENT DOCUMENTS

| | | | |
|---|---|---|---|
| 9,885,911 B2* | 2/2018 | Lee | G02F 1/133308 |
| 2009/0086121 A1* | 4/2009 | Sekiguchi | G02F 1/133605 |
| | | | 349/58 |
| 2012/0050645 A1* | 3/2012 | Okada | G02F 1/133611 |
| | | | 349/64 |

(Continued)

FOREIGN PATENT DOCUMENTS

| | | | | |
|---|---|---|---|---|
| CN | 1971379 A | * | 5/2007 | ....... G02F 1/133604 |
| CN | 1987611 A | * | 6/2007 | ........... G02B 6/0088 |
| EP | 3 163 363 A1 | | 5/2017 | |

(Continued)

OTHER PUBLICATIONS

Communication dated Nov. 9, 2021 issued by the European Patent Office in counterpart European Application No. 20 150 013.9.

(Continued)

*Primary Examiner* — Paul C Lee
(74) *Attorney, Agent, or Firm* — Sughrue Mion, PLLC (57) ABSTRACT

A display apparatus includes a rear chassis, a light source installed in the rear chassis to emit light, a diffuser plate that diffuses light emitted from the light source, a liquid crystal panel positioned in front of the diffuser plate to display an image, a front chassis that supports the liquid crystal panel, and a middle mold coupled between the front chassis and the rear chassis to support the diffuser plate, and is provided with a curved reflective surface formed in a curved shape to reflect the light, which is emitted from the light source module, to the diffuser plate.

18 Claims, 7 Drawing Sheets

(56) References Cited

U.S. PATENT DOCUMENTS

2012/0169945 A1    7/2012  Kuromizu

FOREIGN PATENT DOCUMENTS

| | | |
|---|---|---|
| JP | 2005-094840 A | 4/2005 |
| JP | 4949990 B2 | 6/2012 |
| JP | 2015-191761 A | 11/2015 |
| KR | 10-0682342 B1 | 2/2007 |
| KR | 10-2008-0065457 A | 7/2008 |
| KR | 10-1097699 B1 | 12/2011 |
| KR | 10-2015-0107549 A | 9/2015 |
| KR | 10-1571344 B1 | 11/2015 |
| KR | 10-2016-0083176 A | 7/2016 |

OTHER PUBLICATIONS

Communication dated Mar. 5, 2020, issued by the European Patent Office in counterpart European Application No. 20150013.9.
International Search Report (PCT/ISA/210) dated May 1, 2020 issued by the International Searching Authority in International Application No. PCT/KR2020/000082.

\* cited by examiner

DISPLAY APPARATUS COMPRISING A MIDDLE MOLD FRAME HAVING A REFLECTOR PROVIDED WITH A CURVED REFLECTIVE SURFACE

CROSS-REFERENCE TO RELATED APPLICATION(S)

This application is based on and claims priority under 35 U.S.C. § 119 to Korean Patent Application No. 10-2019-0000944, filed on Jan. 3, 2019, in the Korean Intellectual Property Office, the disclosure of which is incorporated by reference herein in its entirety.

BACKGROUND

1. Field

The disclosure relates to a display apparatus including a backlight unit, and more particularly to a display apparatus capable of improving a dark area generated around an edge of a panel.

2. Description of Related Art

A display apparatus is a type of output device that visually displays data information such as characters and graphics, and images. The display apparatus includes televisions, various monitors, and various portable terminals (e.g., notebooks, tablet PCs and smartphones).

The display apparatus may be an emissive type using a display panel that emits light by itself such as an organic light emitting diode (OLED) panel, and/or a non-emissive type using a display panel that does not emit light by itself and thus receives light from a backlight unit such as a liquid crystal display (LCD) panel.

The backlight unit may include a light source such as a cold cathode fluorescent lamp (CCFL), an external electrode fluorescent lamp (EEFL), and a light emitting diode (LED), and various optical auxiliary materials.

With respect to the position of the light source, the backlight unit may be a direct type in which a light source is disposed behind the display panel, and/or an edge type in which a light source is disposed on the lateral side of the display panel.

The direct type backlight unit may include a diffuser plate positioned in front of the light source to improve the uniformity and brightness of the light. The light emitted from the light source may be guided to the diffuser plate by being reflected from various structures inside the display apparatus. However, when the light emitted from the light source is not uniformly reflected to the diffuser plate, a dark area may occur on the screen.

SUMMARY

Additional aspects of the present disclosure will be set forth in part in the description which follows and, in part, will be obvious from the description, or may be learned by practice of the present disclosure.

In accordance with an aspect of the disclosure, a display apparatus includes a rear chassis; a light source that is disposed in the rear chassis and is configured to emit light; a diffuser plate that is positioned in front of the light source and is configured to diffuse the light emitted from the light source; a liquid crystal panel that is positioned in front of the diffuser plate and is configured to display an image; a front chassis configured to support the liquid crystal panel; and a middle mold that is coupled between the front chassis and the rear chassis to support the diffuser plate, and the middle mold is provided with a curved reflective surface including a curved shape to reflect the light which is emitted from the light source to the diffuser plate.

The curved reflective surface may be concave toward the diffuser plate.

An inner tangent plane may be in contact with an inner line of the curved reflective surface and an outer tangent plane may be in contact with an outer line of the curved reflective surface, and the inner tangent plane and the outer tangent plane may join each other on a single edge, and an intersection angle may be formed between the inner tangent plane and the outer tangent plane.

The rear chassis may include a base on which the light source is installed, and wherein the inner tangent plane in contact with the inner line of the curved reflective surface may be parallel to the base of the rear chassis, and the outer tangent plane in contact with the outer line of the curved reflective surface may be inclined to the base of the rear chassis.

The middle mold may be formed in a frame shape having an opening, and the light source may be positioned in the opening.

The middle mold may include: a frame portion coupled to the front chassis and the rear chassis; a diffuser plate supporter configured to protrude inward from the frame portion to support the diffuser plate; and a reflector configured to extend from the diffuser plate supporter, and the reflector may be provided with the curved reflective surface to reflect the light which is emitted from the light source to the diffuser plate.

The frame portion, the diffuser plate supporter, and the reflector may be integrally formed with each other.

The light source may include a plurality of light sources and a substrate on which the plurality of light sources is mounted, and wherein the middle mold may include a substrate supporter configured to support the substrate.

The middle mold may include a rear supporter extending from the reflector to be supported by the rear chassis.

The curved reflective surface may be formed in an entire area between tan inner line and an outer line of the reflector.

The curved reflective surface may be formed in some area between an inner line and an outer line of the reflector.

The reflector may include a planar reflective surface formed in a plane shape within the curved reflective surface.

The reflector may include a planar reflective surface formed in a plane shape outside the curved reflective surface.

The light source may include a plurality of light sources and a substrate on which the plurality of light sources is mounted, and wherein the display apparatus further may include a reflector sheet positioned on the substrate to reflect light emitted from the plurality of light sources.

In accordance with an aspect of the disclosure, a display apparatus includes a liquid crystal panel configured to display an image; a light source that is positioned behind the liquid crystal panel and is configured to supply light to the liquid crystal panel, and the light source includes a plurality of light sources and a substrate on which the plurality of light sources is mounted; a diffuser plate positioned between the light source and the liquid crystal panel, the diffuser plate being configured to diffuse light which is emitted from the light source to provide the diffused light to the liquid crystal panel; a reflector sheet that is positioned on the substrate and is configured to reflect the light emitted from the light source; and a middle mold provided with a curved reflective surface positioned at a lateral side of the light source, and the middle mold includes a curved shape to reflect the light emitted from the light source.

The reflector sheet and the middle mold may be separate from each other.

The curved reflective surface may be concave toward the diffuser plate.

The middle mold may include: a diffuser plate supporter configured to protrude inward from a frame portion to support the diffuser plate; and a reflector configured to extend from the diffuser plate supporter and provided with the curved reflective surface to reflect the light which is emitted from the light source.

The diffuser plate supporter and the reflector may be integrally formed with each other.

The middle mold may include a substrate supporter configured to support the substrate.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

It is an aspect of the present disclosure to provide a display apparatus capable of prevent a dark area on a screen by allowing light, which is emitted from a light source, to be uniformly reflected to a diffuser plate.

It is another aspect of the present disclosure to provide a display apparatus including a middle mold having an improved shape to uniformly reflect light, which is emitted from a light source, to a diffuser plate.

Embodiments described in the present disclosure and configurations shown in the drawings are merely examples of embodiments, and may be modified in various different ways at the time of filing of the present application.

The singular forms "a," "an" and "the" may be intended to include the plural forms as well, unless the context clearly indicates otherwise. The shape and size of each component illustrated in the drawings may be enlarged for clear expressions.

In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

Figure 1:
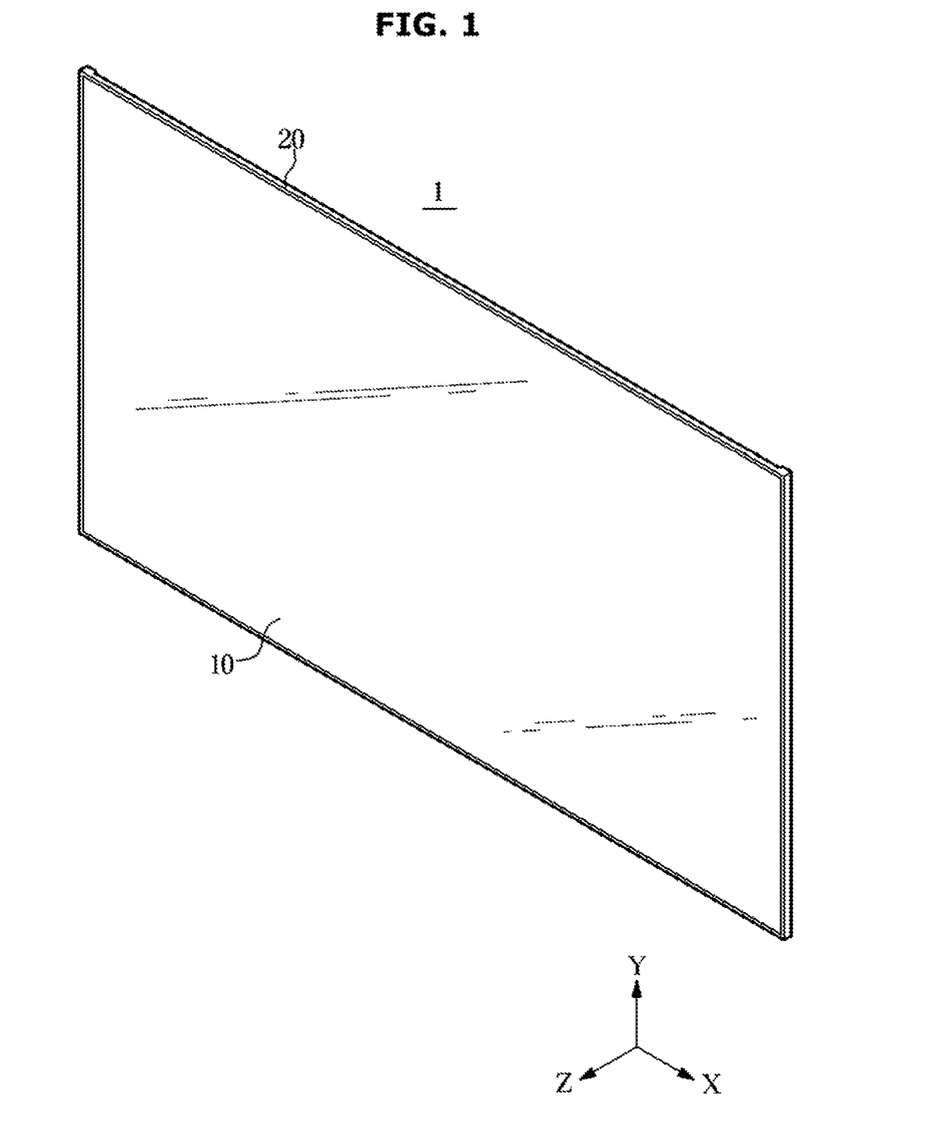
FIG. 1 is a view of an exterior of a display apparatus according to an embodiment.

The directions of "front", "rear", "upper", "lower", "left" and "right" will be referred to throughout the description as a whole based on the directions shown in FIG. 1. In FIG. 1, X-axis, Y-axis, and Z-axis directions perpendicular to each other are indicated, and the X-axis direction is the left-right direction, the Y-axis direction is the up-down direction, and the Z-axis direction is the front-rear direction.

Reference will now be made in detail to embodiments of the disclosure, examples of which are illustrated in the accompanying drawings.

Figure 2:
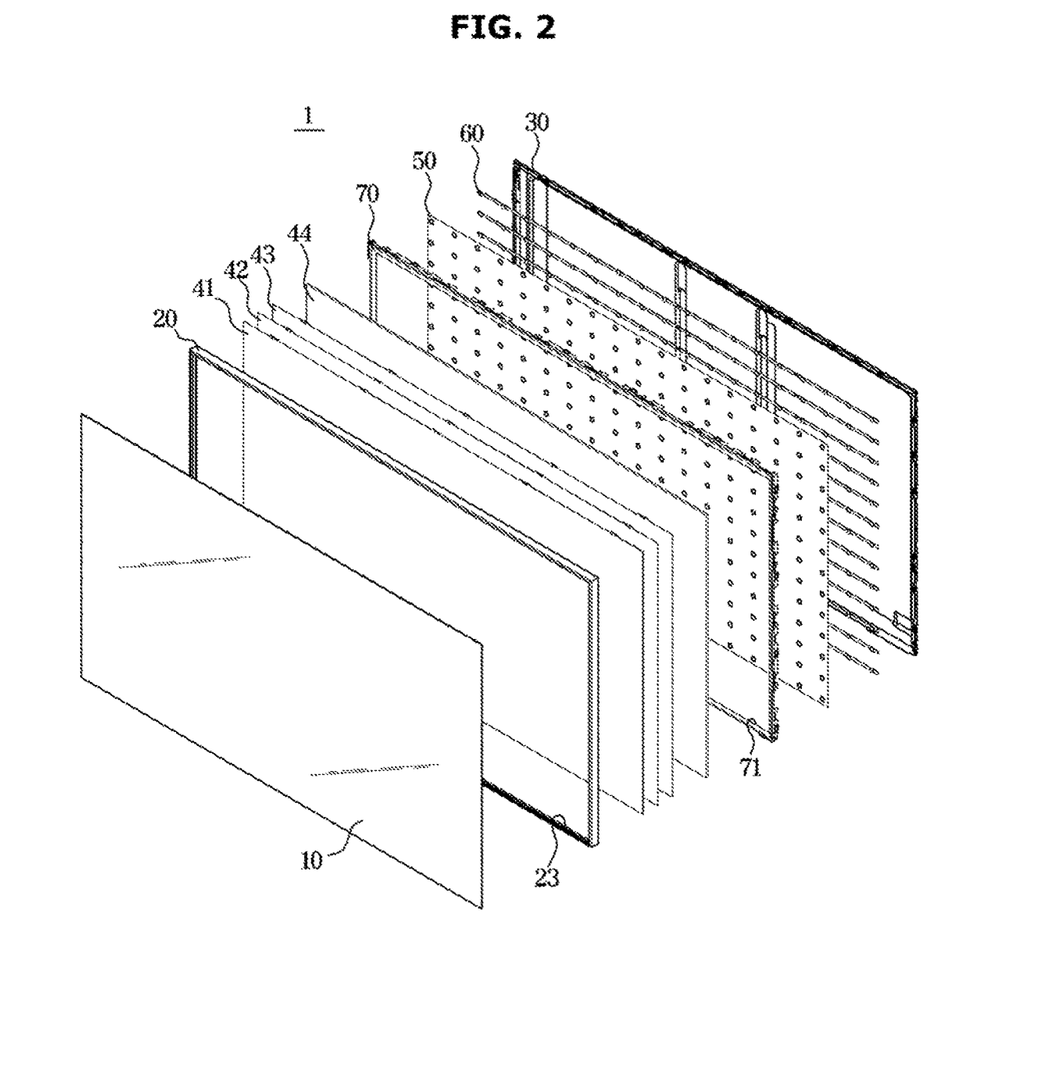
FIG. 2 is an exploded view of main components of the display apparatus according to an embodiment.
Figure 3:
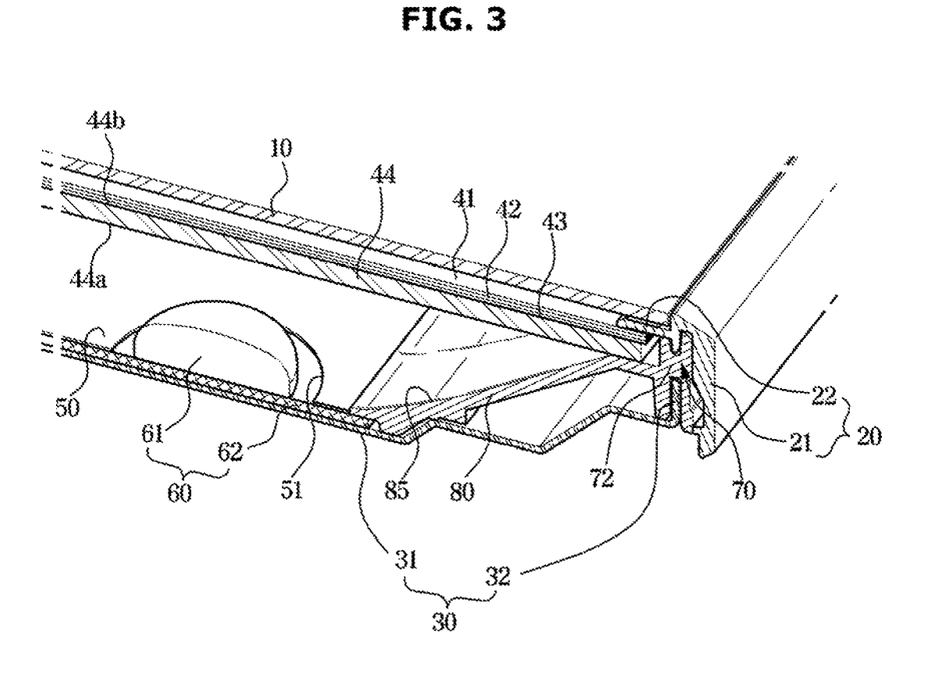
FIG. 3 is a cross-sectional perspective view of the display apparatus according to an embodiment.
Figure 4:
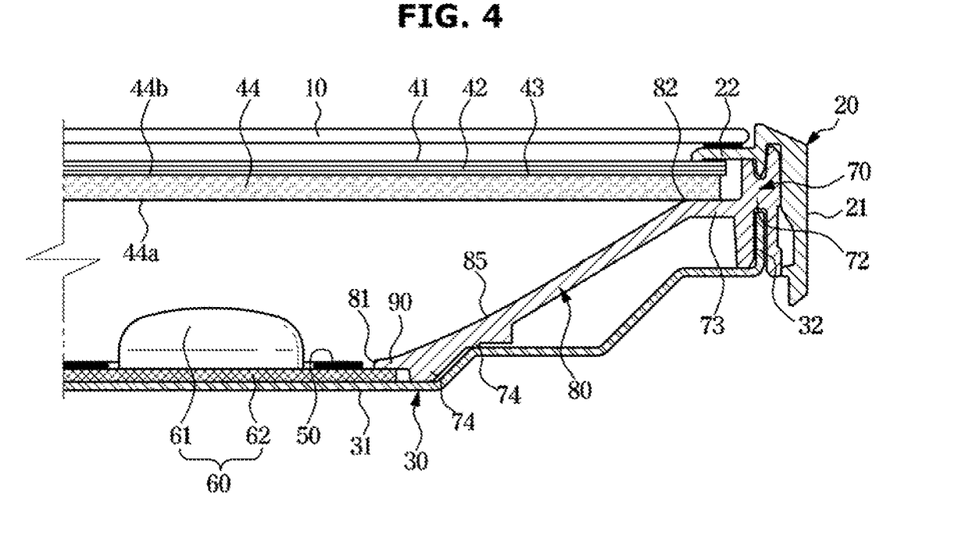
FIG. 4 is a side view of the display apparatus according to an embodiment.
Figure 5:
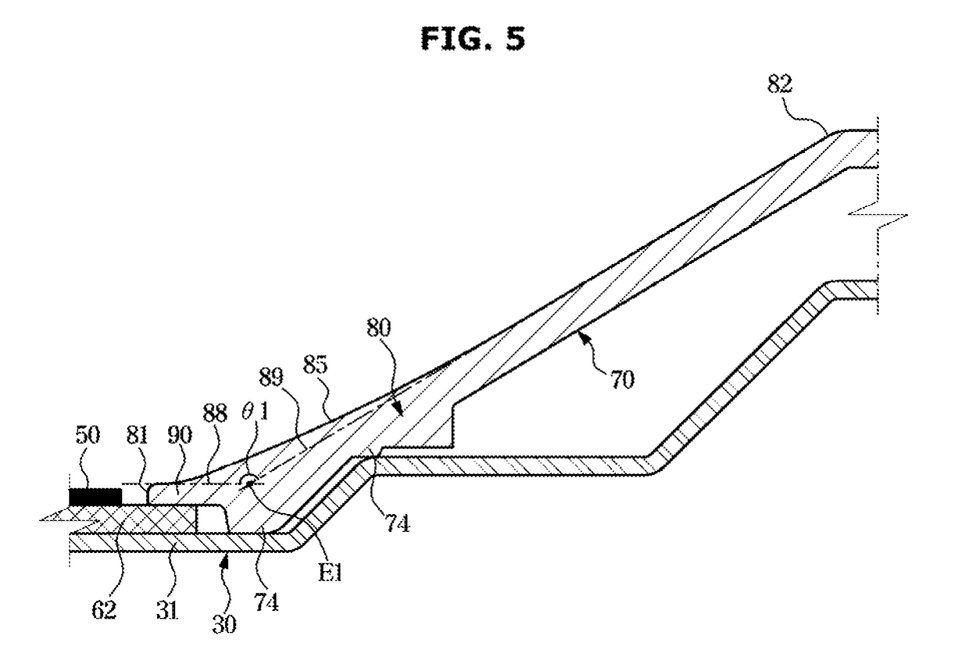
FIG. 5 is an enlarged view of a part of FIG. 4, according to an embodiment.

FIG. 1 is a view of an exterior of a display apparatus according to an embodiment. FIG. 2 is an exploded view of main components of the display apparatus according to an embodiment. FIG. 3 is a cross-sectional perspective view of the display apparatus according to an embodiment. FIG. 4 is a side view of the display apparatus according to an embodiment. FIG. 5 is an enlarged view of a part of FIG. 4.

Below, a display apparatus according to an embodiment will be described with reference to FIGS. 1 to 5.

The display apparatus 1 may include a liquid crystal panel 10 displaying an image, a backlight unit positioned behind the liquid crystal panel 10 to supply light to the liquid crystal panel 10, a rear chassis 30 supporting the backlight unit, a front chassis 20 positioned in front of the rear chassis 30 to support the liquid crystal panel 10, and a middle mold 70 coupled between the front chassis 20 and the rear chassis 30.

The liquid crystal panel 10 may include a thin film transistor substrate in which a thin film transistor is formed in a matrix form, a color filter substrate coupled in parallel with the thin film transistor substrate, and liquid crystal injected between the thin film transistor substrate and the color filter substrate and configured to have optical properties variable according a change in the voltage and the temperature.

The backlight unit is positioned behind the liquid crystal panel 10 to emit light to the liquid crystal panel 10 side. The backlight unit includes a light source module 60 including a light source 61 and a substrate 62 on which the light source 61 is mounted, and an optical member positioned on a path on which the light emitted from the light source 61 is moved.

A plurality of light sources 61 may be mounted in series on the substrate 62. A drive power line for supplying a drive power to the light source 61 may be formed on the substrate 62 and may be connected to a signal cable and a backlight drive circuit.

A light emitting diode (LED) may be used as the light source 61. In addition, a cold cathode fluorescent lamp (CCFL) and an external electrode fluorescent lamp (EEFL) may be used as the light source 61.

The optical member may be positioned on the path, on which the light emitted from the light source 61 is moved, to guide a travel direction of the light, to reflect the light, to diffuse the light and/or to improve the optical properties.

The optical member may include a reflector sheet 50 preventing the loss of the light by reflecting the light, a diffuser plate 44 uniformly diffusing irregular light emitted from the light source 61, a quantum dot sheet 43 improving the color reproducibility by changing the wavelength of light, and optical sheets 41 and 42 improving the optical properties.

The reflector sheet 50 reflects light that is emitted from the light source 61, or light that is moved backward from the diffuser plate 44, to a back surface 44a of the diffuser plate 44. The reflector sheet 50 may be arranged on the substrate 62. The reflector sheet 50 may adhere to the substrate 62. On the reflector sheet 50, a through hole 51 may be formed to allow the light source 61 to pass.

The diffuser plate 44 may uniformly diffuse irregular light generated in the light source 61 and support the quantum dot sheet 43 and the optical sheets 41 and 42. The diffuser plate 44 may uniformly diffuse light, which is incident to the back surface 44a, and then transmit the light to a front surface 44b.

The quantum dot sheet 43 may be positioned in front of the diffuser plate 44 to be apart from the diffuser plate 44. Inside the quantum dot sheet 43, quantum dot may be dispersed and the quantum dot may correspond to a few nanometers of the semiconductor crystal that is luminous. Quantum dots may receive blue light and generate all the colors of visible light according to the size of the blue light. The smaller the quantum dot size, the shorter the wavelength of light, and the larger the quantum dot size, the longer the wavelength of light.

The optical sheets 41 and 42 may be positioned in front of the diffuser plate 44 to improve the optical properties of light transmitted from the diffuser plate 44. The optical sheets 41 and 42 may include a diffuser sheet offsetting the pattern of the diffuser plate 44, a prism sheet improving the brightness by focusing the light, a protection sheet protecting other optical sheet from external shocks or foreign substances, and a dual brightness enhancement film (DBEF) improving the brightness by transmitting one polarized light and by reflecting other polarized light The rear chassis 30 is positioned behind the backlight unit. The rear chassis 30 may have a plate shape in which an approximate edge portion is bent forward. The backlight unit may be placed between the rear chassis 30 and the front chassis 20.

The rear chassis 30 may include a base 31 on which the light source module 60 is installed, and a rear lateral side portion 32 formed on upper, lower, left and right edges of the rear chassis 30 to be coupled with the middle mold 70.

The rear chassis 30 may function to dissipate heat, which is generated in a heating element such as the light source 61, to the outside. To this, the rear chassis 30 may be formed of various metal materials such as aluminum and SUS, or plastic materials such as acrylonitrile butadiene and styrene (ABS).

The front chassis 20 may be formed in a frame shape having an opening 23 to allow the light of the backlight unit to be supplied to the liquid crystal panel 10. The front chassis 20 may include a front lateral side portion 21 formed at upper, lower, right, and left edges of the front chassis 20 to be coupled with the middle mold 70, and a panel supporter 22 protruding inward from the front lateral side portion 21 to support the liquid crystal panel 10.

The middle mold 70 is configured to support the diffuser plate 44 and reflect the light emitted from the light source module 60 toward the diffuser plate 44. The middle mold 70 may maintain a gap between the diffuser plate 44 and the light source module 60. The middle mold 70 may be coupled between the front chassis 20 and the rear chassis 30.

The middle mold 70 may be formed in a frame shape having an opening 71 (FIG. 2). The light source module 60 may be positioned in the opening 71. The middle mold 70 may include a frame portion 72 to which the front chassis 20 and the rear chassis 30 are coupled, a diffuser plate supporter 73 protruding inward from the frame portion 72 to support the diffuser plate 44, and a reflector 80 extending from the diffuser plate supporter 73 to reflect the light.

The frame portion 72 may be formed on the upper, lower, left, and right edges of the middle mold 70. The frame portion 72 may be coupled to the front chassis 20 and the rear chassis 30 through various known fitting structures and separate fastening members.

The diffuser plate supporter 73 may protrude inward from the frame portion 72 to support the diffuser plate 44. The diffuser plate supporter 73 may support an edge portion of the back surface 44a of the diffuser plate 44. The diffuser plate supporter 73 may be formed in parallel to the base 31 of the rear chassis 30.

The reflector 80 may reflect the light emitted from the light source module 60 to the back surface 44a of the diffuser plate 44. Particularly, the reflector 80 may reflect the light, which is emitted from the light source module 60, toward the edge of the back surface 44a of the diffuser plate 44. The reflector 80 may approximately extend obliquely from the diffuser plate supporter 73 toward the rear inner side.

The reflector 80 may include a curved reflective surface 85 formed as a curved surface to uniformly reflect the light emitted from the light source module 60. The curved reflective surface 85 may be smoothly curved so as not to be angled. The curved reflective surface 85 may be concave toward the diffuser plate 44. The light emitted from the light source module 60 may be uniformly reflected by the diffuser plate 44 by the shape of the curved reflective surface 85. The light uniformly incident on the diffuser plate 44 may uniformly pass through the liquid crystal panel 10. Therefore, a dark area may not be generated on the screen, and thus the picture quality may be improved.

The curved reflective surface 85 may be formed in the entire area between an inner line 81 and an outer line 82 of the reflector 80. The inner line 81 of the reflector 80 may correspond to a line placed on the innermost side in the reflector 80, and the outer line 82 of the reflector 80 may correspond to a line placed on the outermost side in the reflector 80.

That is, the entire area between the inner line 81 and the outer line 82 of the reflector 80 may be formed as a curved surface. An inner line 81 of the curved reflective surface 85 may serve as the inner line 81 of the reflector 80 and an outer line 82 of the curved reflective surface 85 may serve as the outer line 82 of the reflector 80.

An inner tangent plane 88 in contact with the inner line 81 of the curved reflective surface 85 and an outer tangent plane 89 in contact with the outer line 82 of the curved reflective surface 85 may be in contact with each other on a single edge E1. An intersection angle $\theta1$ may be formed between the inner tangent plane 88 and the outer tangent plane 89.

The inner tangent plane 88 may be positioned in parallel to the base 31 of the rear chassis 30. The outer tangent plane 89 may be inclined to the base 31 of the rear chassis 30.

The middle mold 70 may include a substrate supporter 90 supporting the substrate 62 of the light source module 60. The substrate supporter 90 may fix the substrate 62 so that the substrate 62 does not lift up on the base 31. The substrate supporter 90 may be formed at the inner end of the reflector 80. An edge portion of the substrate 62 may be supported between the substrate supporter 90 and the base 31.

The frame portion 72, the diffuser plate supporter 73, and the reflector 80 of the middle mold 70 may be integrally formed with each other. That is, the reflector 80 may not be formed by being manufactured separately and coupled to the middle mold 70, but the reflector 80 corresponding to a part of the middle mold 70 may be molded with the frame portion 72 and the diffuser plate supporter 73 corresponding to other part of the middle mold 70. Therefore, the number of components of the display apparatus may be reduced and the assembly process may be simplified, thereby reducing the cost and improving the convenience of the assembly.

The middle mold 70 may further include a rear supporter 74 extending from the reflector 80 to be supported by the rear chassis 30. The rear supporter 74 may be also integrally formed with the frame portion 72 and the diffuser plate supporter 73 and the reflector 80.

A surface of the middle mold 70 may be coated with a material having high reflectance. The high reflectance material may be coated on the entire surface of the middle mold 70 or only on the surface of the reflector 80. The middle mold 70 or the reflector 80 may have a white color to reflect light well.

Figure 6:
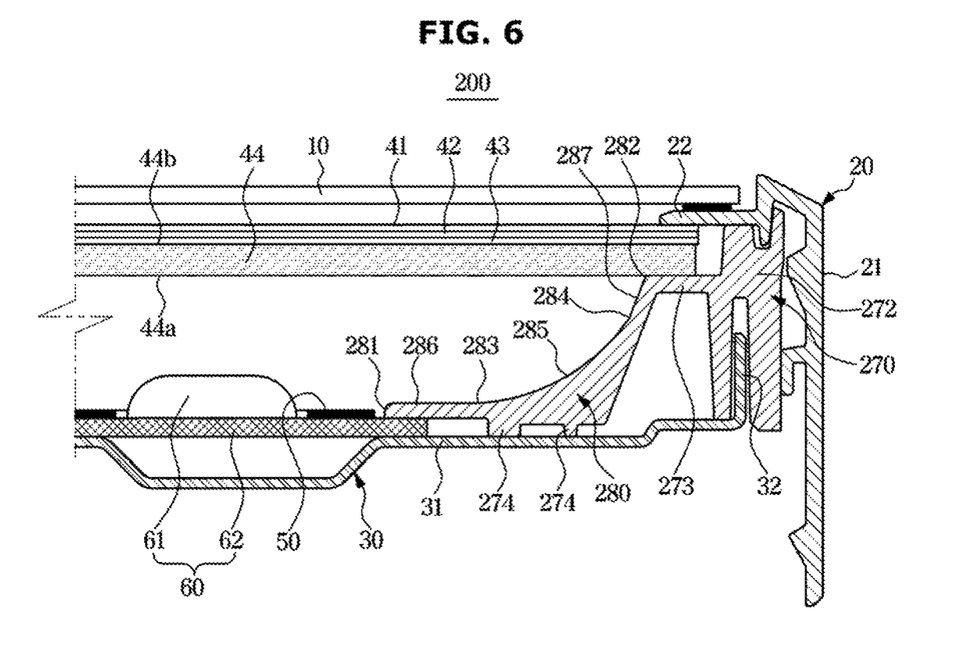
FIG. 6 is a side cross-sectional view of a display apparatus according to an embodiment.
Figure 7:
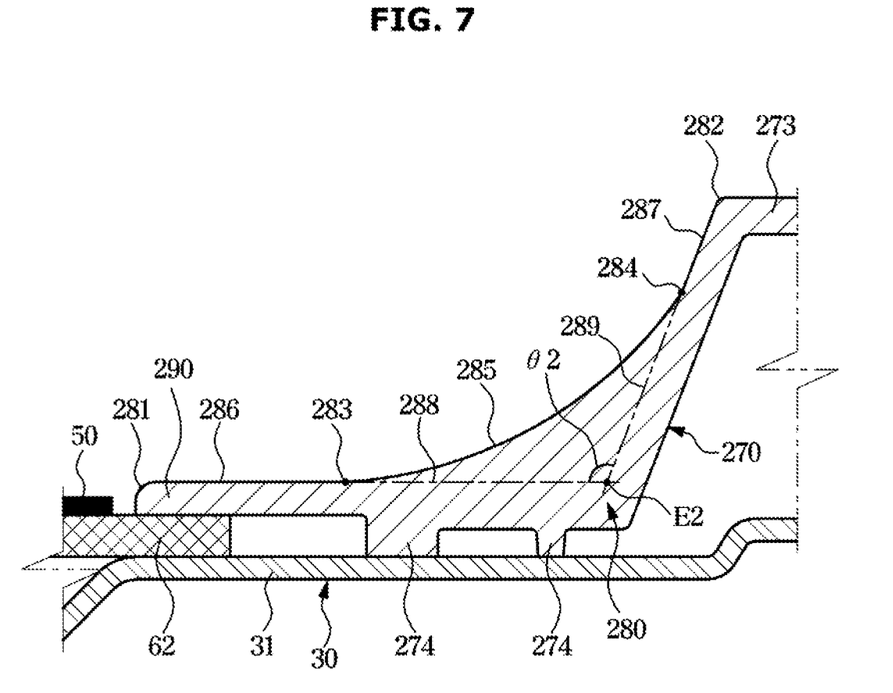
FIG. 7 is an enlarged view of a part of FIG. 5, according to an embodiment.

FIG. 6 is a side cross-sectional view of a display apparatus according to an embodiment. FIG. 7 is an enlarged view of a part of FIG. 5.

Below, a display apparatus according to an embodiment will be described with reference to FIGS. 6 and 7. The same reference numerals are assigned to the same components as those of the above-described embodiment, and description thereof may be omitted.

A display apparatus 200 may include a liquid crystal panel 10 displaying an image, a backlight unit positioned behind the liquid crystal panel 10 to supply light to the liquid crystal panel 10, a rear chassis 30 supporting the backlight unit, a front chassis 20 positioned in front of the rear chassis 30 to support the liquid crystal panel 10, and a middle mold 270 coupled between the front chassis 20 and the rear chassis 30.

The middle mold 270 is configured to support a diffuser plate 44 and reflect the light emitted from a light source module 60 toward the diffuser plate 44. The middle mold 270 may maintain a gap between the diffuser plate 44 and the light source module 60. The middle mold 270 may be coupled between the front chassis 20 and the rear chassis 30.

The middle mold 270 may include a frame portion 272 to which the front chassis 20 and the rear chassis 30 are coupled, a diffuser plate supporter 273 protruding inward from the frame portion 272 to support the diffuser plate 44, a rear supporter 274, and a reflector 280 extending from the diffuser plate supporter 273 to reflect the light.

The frame portion 272 may be formed on upper, lower, left, and right edges of the middle mold 270. The frame portion 272 may be coupled to the front chassis 20 and the rear chassis 30 through various known fitting structures and separate fastening members.

The diffuser plate supporter 273 may protrude inward from the frame portion 272 to support the diffuser plate 44. The diffuser plate supporter 273 may support an edge portion of a back surface 44a of the diffuser plate 44. The diffuser plate supporter 273 may be formed in parallel to a base 31 of the rear chassis 30.

The reflector 280 may reflect the light emitted from the light source module 60 to the back surface 44a of the diffuser plate 44. Particularly, the reflector 280 may reflect the light emitted from the light source module 60 toward the edge of the back surface 44a of the diffuser plate 44.

The reflector 280 may include a curved reflective surface 285 formed as a curved surface to uniformly reflect the light emitted from the light source module 60. The curved reflective surface 285 may be smoothly curved so as not to be angled. The curved reflective surface 285 may be concave toward the diffuser plate 44. The light emitted from the light source module 60 may be uniformly reflected by the diffuser plate 44 by the shape of the curved reflective surface 285. The light uniformly incident on the diffuser plate 44 may uniformly pass through the liquid crystal panel 10. Therefore, the dark area may be not generated on the screen, and thus the picture quality may be improved.

The middle mold 270 may include a substrate supporter 290 supporting the substrate 62 of the light source module 60. The substrate supporter 290 may fix the substrate 62 so that the substrate 62 does not lift up on the base 31. The substrate supporter 290 may be formed at the inner end of the reflector 280. An edge portion of the substrate 62 may be supported between the substrate supporter 290 and the base 31.

Unlike the above-described embodiment, the curved reflective surface 285 may be formed only in some sections between an inner line 281 and an outer line 282 of the reflector 280. That is, the curved reflective surface 285 may be formed on a section between a first middle line 283 and a second middle line 284 of the reflector 280.

The first middle line 283 may correspond to one line positioned between the inner line 281 of the reflector 280 and the outer line 282 of the reflector 280, and the second middle line 284 may be correspond to other line positioned between the inner line 281 of the reflector 280 and the outer line 282 of the reflector 280.

The inner line 283 of the curved reflective surface 285 may serve as the first middle line 283 of the reflector 280 and the outer line 284 of the curved reflective surface 285 may serve as the second middle line 284 of the reflector 280.

An inner tangent plane 288 in contact with the inner line 283 of the curved reflective surface 285 and an outer tangent plane 289 in contact with the outer line 284 of the curved reflective surface 285 may be in contact with each other on a single edge E2. An intersection angle θ2 may be formed between the inner tangent plane 288 and the outer tangent plane 289.

The inner tangent plane 288 may be positioned in parallel to the base 31 of the rear chassis 30. The outer tangent plane 289 may be inclined to the base 31 of the rear chassis 30.

The reflector 280 may include a planar reflective surface 286 formed in a plane shape inside the curved reflective surface 285. That is, the planar reflective surface 286 having a planar surface may be formed between the inner line 281 of the reflector 280 and the first middle line 283 of the reflector 280.

In addition, the reflector 280 may include a planar reflective surface 287 formed in a plane shape outside the curved reflective surface 285. That is, the planar reflective surface 287 having a planar surface may be formed between the second middle line 284 of the reflector 280 and the outer line 282 of the reflector 280.

According to an embodiment, the reflector 280 may include both of the planar reflective surface 286 and the planar reflective surface 287, but is not limited thereto. Therefore, the reflector 280 may include any one or both of the planar reflective surface 286 and the planar reflective surface 287.

That is, a planar reflective surface may be formed from the inner line 281 to the first middle line 283 of the reflector 280, and a curved reflective surface may be formed from the first middle line 283 to the outer line 282 of the reflector 280.

Alternatively, a curved reflective surface may be formed from the inner line 281 to the second middle line 284 of the reflector 280, and a planar reflective surface may be formed from the second middle line 284 to the outer line 282 of the reflector 280.

As is apparent from the above description, it may be possible to prevent a dark area on a screen by allowing light, which is emitted from a light source, to be uniformly reflected to a diffuser plate.

It may be possible to uniformly reflect light, which is emitted from a light source, to a diffuser plate by improving a shape of a middle mold. Therefore, because additional structures are not required, it may be possible to reduce the cost and to improve the convenience of the assembly.

Although embodiments have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
a rear chassis;
a light source that is disposed in the rear chassis and is configured to emit light;
a diffuser plate that is positioned in front of the light source and is configured to diffuse the light emitted from the light source;
a liquid crystal panel that is positioned in front of the diffuser plate and is configured to display an image;
a front chassis configured to support the liquid crystal panel; and
a middle mold that is coupled between the front chassis and the rear chassis to support the diffuser plate, and the middle mold comprises a reflector provided with a curved reflective surface to reflect the light which is emitted from the light source to the diffuser plate,
wherein the light source comprises a plurality of light sources and a substrate disposed on the rear chassis,
wherein the substrate has an upper surface and a lower surface, the plurality of light sources being mounted on the upper surface of the substrate, and the lower surface of the substrate facing the rear chassis, and
wherein the middle mold comprises a substrate supporter disposed at an inner end of the reflector, positioned on the upper surface of the substrate and configured to support the substrate, an edge portion of the substrate being supported between the substrate supporter and the rear chassis.

2. The display apparatus of claim 1, wherein the curved reflective surface is concave toward the diffuser plate.

3. The display apparatus of claim 1, wherein an inner tangent plane is in contact with an inner line of the curved reflective surface and an outer tangent plane is in contact with an outer line of the curved reflective surface, and the inner tangent plane and the outer tangent plane join each other on a single edge, and an intersection angle is formed between the inner tangent plane and the outer tangent plane.

4. The display apparatus of claim 3, wherein the rear chassis comprises a base on which the light source is installed, and
wherein the inner tangent plane in contact with the inner line of the curved reflective surface is parallel to the base of the rear chassis, and the outer tangent plane in contact with the outer line of the curved reflective surface is inclined to the base of the rear chassis.

5. The display apparatus of claim 1, wherein the middle mold is formed in a frame shape having an opening, and the light source is positioned in the opening.

6. The display apparatus of claim 1, wherein the middle mold comprises:
a frame portion coupled to the front chassis and the rear chassis;
a diffuser plate supporter configured to protrude inward from the frame portion to support the diffuser plate; and
wherein the reflector is configured to extend from the diffuser plate supporter.

7. The display apparatus of claim 6, wherein the frame portion, the diffuser plate supporter, and the reflector are integrally formed with each other.

8. The display apparatus of claim 6, wherein the middle mold further comprises a rear supporter extending from the reflector to be supported by the rear chassis.

9. The display apparatus of claim 6, wherein the curved reflective surface is formed in an entire area between tan inner line and an outer line of the reflector.

10. The display apparatus of claim 6, wherein the curved reflective surface is formed in some area between an inner line and an outer line of the reflector.

11. The display apparatus of claim 10, wherein the reflector comprises a planar reflective surface formed in a plane shape within the curved reflective surface.

12. The display apparatus of claim 10, wherein the reflector comprises a planar reflective surface formed in a plane shape outside the curved reflective surface.

13. The display apparatus of claim 1,
wherein the display apparatus further comprises a reflector sheet positioned on and contacting the upper surface of the substrate to reflect light emitted from the plurality of light sources.

14. A display apparatus comprising:
a rear chassis;
a liquid crystal panel configured to display an image;
a light source that is positioned behind the liquid crystal panel and is configured to supply light to the liquid crystal panel, and the light source comprises a plurality of light sources and a substrate on which the plurality of light sources are mounted, the substrate having an upper surface and a lower surface, the plurality of light sources being mounted on the upper surface of the substrate, and the lower surface of the substrate facing the rear chassis;
a diffuser plate positioned between the light source and the liquid crystal panel, the diffuser plate being configured to diffuse light which is emitted from the light source to provide the diffused light to the liquid crystal panel;
a reflector sheet that is positioned on the substrate and is configured to reflect the light emitted from the light source;
a front chassis configured to support the liquid crystal panel; and
a middle mold that is coupled between the front chassis and the rear chassis to support the diffuser plate,
wherein the middle mold comprises:
a frame portion coupled to the front chassis and the rear chassis;
a diffuser plate supporter configured to protrude inward from the frame portion to support the diffuser plate;
a reflector configured to extend from the diffuser plate supporter and provided with the a curved reflective surface to reflect the light, which is emitted from the light source, to the diffuser plate, and
a substrate supporter disposed at an inner end of the reflector, positioned on the upper surface of the substrate, and configured to support the substrate, an edge portion of the substrate being supported between the substrate supporter and the rear chassis, and
wherein the curved reflective surface is concave toward the diffuser plate.

15. The display apparatus of claim 14, wherein the reflector sheet and the middle mold are separate from each other.

16. The display apparatus of claim 14, wherein the diffuser plate supporter and the reflector are integrally formed with each other.

17. The display apparatus of claim 14, wherein an inner tangent plane is in contact with an inner line of the curved reflective surface and an outer tangent plane is in contact with an outer line of the curved reflective surface, and the inner tangent plane and the outer tangent plane join each other on a single edge, and an intersection angle is formed between the inner tangent plane and the outer tangent plane,
- wherein the rear chassis comprises a base on which the light source is installed, and
- wherein the inner tangent plane in contact with the inner line of the curved reflective surface is parallel to the base of the rear chassis, and the outer tangent plane in contact with the outer line of the curved reflective surface is inclined to the base of the rear chassis.

18. The display apparatus of claim 14, wherein the reflector sheet is positioned on and contacts the upper surface of the substrate.

* * * * *